(12) United States Patent
Lakshman et al.

(10) Patent No.: US 11,849,104 B2
(45) Date of Patent: *Dec. 19, 2023

(54) MULTI-RESOLUTION MULTI-VIEW VIDEO RENDERING

(71) Applicant: Dolby Laboratories Licensing Corporation, San Francisco, CA (US)

(72) Inventors: Haricharan Lakshman, Sunnyvale, CA (US); Wenhui Jia, Dublin, CA (US); Jasper Chao, Livermore, CA (US); Shwetha Ram, San Jose, CA (US); Domagoj Baricevic, Sunnyvale, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,790

(22) Filed: Jun. 27, 2022

(65) Prior Publication Data
US 2022/0329775 A1    Oct. 13, 2022

Related U.S. Application Data

(63) Continuation of application No. 16/809,397, filed on Mar. 4, 2020, now Pat. No. 11,375,178.

(60) Provisional application No. 62/813,527, filed on Mar. 4, 2019.

(51) Int. Cl.
H04N 13/351    (2018.01)

(52) U.S. Cl.
CPC .................... *H04N 13/351* (2018.05)

(58) Field of Classification Search
CPC ... H04N 13/344; H04N 13/351; H04N 13/383
See application file for complete search history.

(56) References Cited

U.S. PATENT DOCUMENTS

| | | | |
|---|---|---|---|
| 8,842,114 B1 * | 9/2014 | Cook | H04N 13/128 359/458 |
| 9,967,592 B2 * | 5/2018 | Zhang | H04N 19/577 |
| 10,070,125 B2 | 9/2018 | Hannuksela | |
| 10,085,005 B2 * | 9/2018 | Pitts | H04N 23/957 |
| 10,157,469 B2 | 12/2018 | Smits | |

(Continued)

*Primary Examiner* — Md N Haque

(57) ABSTRACT

A device and method for video rendering. The device includes a memory and an electronic processor. The electronic processor is configured to receive, from a source device, video data including multiple reference viewpoints, determine a target image plane corresponding to a target viewpoint, determine, within the target image plane, one or more target image regions, and determine, for each target image region, a proxy image region larger than the corresponding target image region. The electronic processor is configured to determine, for each target image region, a plurality of reference pixels that fit within the corresponding proxy image region, project, for each target image region, the plurality of reference pixels that fit within the corresponding proxy image region to the target image region, producing a rendered target region from each target image region, and composite one or more of the rendered target regions to create video rendering.

20 Claims, 6 Drawing Sheets

(56) References Cited

U.S. PATENT DOCUMENTS

| | | | |
|---|---|---|---|
| 2009/0079762 A1* | 3/2009 | Fukushima | H04N 13/275 345/621 |
| 2012/0268465 A1* | 10/2012 | Inada | G06T 11/00 345/428 |
| 2015/0035830 A1* | 2/2015 | Zhang | G06T 15/10 345/426 |
| 2015/0103144 A1* | 4/2015 | Shibazaki | H04N 13/218 348/46 |
| 2018/0011533 A9 | 1/2018 | Marggraff | |
| 2018/0262758 A1 | 9/2018 | El-Ghoroury | |
| 2018/0308455 A1 | 10/2018 | Hicks | |
| 2019/0060602 A1* | 2/2019 | Tran | G06F 3/013 |
| 2019/0064926 A1* | 2/2019 | Danieau | G06F 3/0414 |
| 2019/0174125 A1* | 6/2019 | Ninan | H04N 21/23439 |

* cited by examiner

MULTI-RESOLUTION MULTI-VIEW VIDEO RENDERING

CROSS-REFERENCE TO RELATED APPLICATION(S)

The present application is a continuation of U.S. patent application Ser. No. 16/809,397 filed Mar. 4, 2020, which claims the benefit of priority to U.S. Provisional Patent Application No. 62/813,527 filed Mar. 4, 2019, both of which are incorporated herein by reference in their entirety.

BACKGROUND

1. Field of the Disclosure

This application relates generally to the rendering of three dimensional (3D) images.

2. Description of Related Art

To represent a 3D scene, source content may be represented using a projective mapping technique. Some methods for 3D view synthesis use entire reference pixels in 3D warping. However, processing entire reference pixels may result in problems; for example, such processing may require a high memory bandwidth, high computational complexity, and/or a high data rate.

For example, consider a target image with a resolution of 2000 by 2000 pixels, corresponding to a 90 degree field of view (FOV). In the case of cube mapping, the entire 360° scene will need six faces. Where two references are used for view synthesis, the total amount of data is 2000 (pixels)× 2000 (pixels)×6 (faces)×2 (references)×4 (three colors+ depth). As a result, the memory storage capacity and computational complexity increase by a factor of 6×2×4=48, regardless of the number of pixels. Even using video compression, the data rate requirement is still approximately 48 times that of a single 2k by 2k video rate. In the case of stereo render, the data, memory, and computational requirements may further increase.

Accordingly, there exists a need for a method of multi-view video rendering that reduces data rate and computational complexity.

SUMMARY OF THE DISCLOSURE

Various aspects of the present disclosure relate to systems and methods for improved rendering of multi-view, multi-source image rendering.

In one exemplary aspect of the present disclosure, there is provided a device for video rendering. The device includes a memory and an electronic processor. The electronic processor is configured to receive, from a source device, video data including multiple reference viewpoints, determine a target image plane corresponding to a target viewpoint, determine, within the target image plane, one or more target image regions, and determine, for each target image region within the target image plane, a proxy image region. The proxy image region is larger than the corresponding target image region by a margin surrounding the corresponding target image region. The electronic processor is further configured to determine, for each target image region within the target image plane, a plurality of reference pixels that fit within the corresponding proxy image region, from one or more of the multiple reference viewpoints, project, for each target image region within the target image plane, the plurality of reference pixels that fit within the corresponding proxy image region, from the one or more multiple reference viewpoints, to the target image region within the target image plane, producing a rendered target region from each target image region, and composite one or more of the rendered target regions to create video rendering for the target image plane.

In another exemplary aspect of the present disclosure, there is provided a method for video rendering. The method includes receiving, from a source device, video data including multiple reference viewpoints, determining a target image plane corresponding to a target viewpoint, determining, within the target image plane, one or more target image regions, and determining, for each target image region within the target image plane, a proxy image region. The proxy image region is larger than the corresponding target image region by a margin surrounding the corresponding target image region. The method further includes determining, for each target image region within the target image plane, a plurality of reference pixels that fit within the corresponding proxy image region, from one or more of the multiple reference viewpoints, projecting, for each target image region within the target image plane, the plurality of reference pixels that fit within the corresponding proxy image region, from the one or more multiple reference viewpoints, to the target image region within the target image plane, producing a rendered target region from each target image region, and compositing one or more of the rendered target regions to create video rendering for the target image plane.

In another exemplary aspect of the present disclosure, there is provided a device for video rendering. The device includes a memory and an electronic processor. The electronic processor is configured to receive source content including multiple reference viewpoints, map the source content using a projective mapping technique, partition the mapped source content into a plurality of tiles, and determine a subset of the plurality of regions for synthesis of a target view based on a proxy image region surrounding each target image region. The electronic processor is further configured to render the subset of the plurality of regions.

In another exemplary aspect of the present disclosure, there is provided a non-transitory computer-readable medium storing instructions that, when executed by a processor of a computer, cause the computer to perform operations including receiving, from a source device, video data including multiple reference viewpoints determining a target image plane corresponding to a target viewpoint, and determining, within the target image plane, one or more target image regions. The operations further include determining, for each target image region within the target image plane, a proxy image region, the proxy image region being larger than the corresponding target image region by a margin surrounding the corresponding target image region, determining, for each target image region within the target image plane, a plurality of reference pixels that fit within the corresponding proxy image region, from one or more of the multiple reference viewpoints, projecting, for each target image region within the target image plane, the plurality of reference pixels that fit within the corresponding proxy image region, from the one or more multiple reference viewpoints, to the target image region within the target image plane, producing a rendered target region from each target image region, and compositing one or more of the rendered target regions to create video rendering for the target image plane.

In another exemplary aspect of the present disclosure, there is provided a non-transitory computer-readable medium storing instructions that, when executed by a processor of a computer, cause the computer to perform operations including receiving source content including multiple reference viewpoints, mapping the source content using a projective mapping technique, partitioning the mapped source content into a plurality of target image regions, determining a subset of the plurality of target image regions for synthesis of a target view based on a proxy image region surrounding each target image region, and rendering the subset of the plurality of regions.

In this manner, various aspects of the present disclosure provide for the rendering of 3D images and improvements in at least the technical fields of 3D image rendering, signal processing, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

Figure 1A:
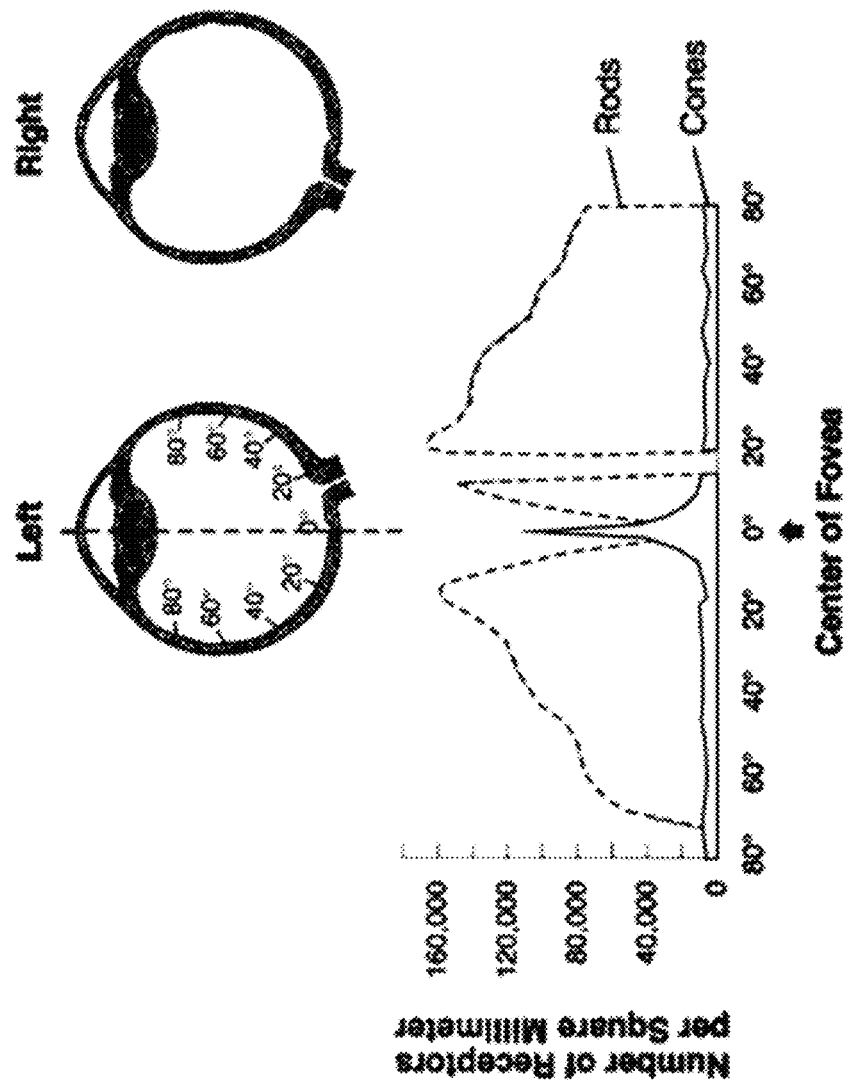
FIG. 1A is an example of distributions of photoreceptors present in the human eye.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to minimize requirements for memory bandwidth, data rate, and/or computational complexity in video applications, which may include the display of video content and/or the streaming of video content between video streaming server(s) and video streaming client(s).

A video application as described herein may refer to any one or more of: video display applications, virtual reality (VR) applications, augmented reality (AR) applications, automobile entertainment applications, remote presence applications, display applications, and the like.

Example video content may include, but is not limited to, any one or more of: audiovisual programs, movies, video programs, TV broadcasts, computer games, AR content, VR content, automobile entertainment content, and the like.

Example video streaming clients may include, but are not necessarily limited to, any one or more of: display devices, a computing device with a near-eye display, a head-mounted display (HMD), a mobile device, a wearable display device, a set-top box with a display such as television, a video monitor, and the like.

As used herein, a "video streaming server" may refer to one or more upstream devices that prepare and stream omnidirectional video content to one or more video streaming clients in order to render at least a portion (e.g., corresponding to a user's FOV or viewport, etc.) of the omnidirectional video content on one or more displays. The displays on which the omnidirectional video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox™), general purpose personal computers, tablets, dedicated digital media receivers such as the Apple TV™ or the Roku™ box, etc.

Techniques as described herein can be used to support an individual-viewer-experience view direction based omnidirectional video application with the highest visual acuity (e.g., supported by source omnidirectional video, etc.). As used herein, an omnidirectional video application may refer to any of: video display applications, VR applications, AR applications, automobile entertainment applications, remote presence applications, display applications, etc. The term "high visual acuity" or "the highest acuity" may refer to a pixel density that has little or no perceptible pixilation effect. The techniques as described herein provides omnidirectional video content with spatially varying resolutions that can be transmitted with low bandwidths while creating perceptions of high spatial resolution wherever a viewer directs view directions. The viewer's view directions can be tracked by any combination of view direction tracking methods including but not limited to gaze tracking, viewport tracking, FOV tracking, viewer position tracking, face tracking, or any other view direction tracking methods.

View direction data is preferably collected from a single viewer (or user). Example view direction data may include, without limitation, linear displacements, angular displacements, linear motions or translations, angular motions or rotations, pitch, roll, yaw, sway, heave, surge, up to six degrees of freedom, etc., that may be collected by any combination of gaze tracking devices, position tracking devices, viewport tracking devices, face tracking devices, FOV tracking devices, etc. The viewer's view directions at a plurality of time points may be determined. The viewer's view directions can be (e.g., additionally, optionally, alternatively, etc.) used on the recipient device itself to generate new views until the upstream devices respond with new data. The viewer's view directions can also be fed back to upstream devices to generate, from omnidirectional images, specific image layers in reference to the viewer's view directions with different image related properties such as spatial resolutions, frame rates, dynamic ranges, color gamuts, etc. Instead of sending the omnidirectional images with large data volumes, the specific image layers generated in reference to the viewer's view directions, which amount to much less data volumes than the large data volumes of the omnidirectional images, are sent to the viewer's display device for rendering. In some embodiments, only a very tiny region in the viewer's vision field is given image data of the highest quality while image data in other regions of the viewer's vision field can be greatly compressed and/or downsampled.

As mentioned above, image based rendering techniques are utilized in 3D imaging applications such as 3D television, omnidirectional (360°) video, and VR. To represent a 3D scene, the source content may be represented using a projective mapping. Each new scene, defined by a different viewpoint, may be synthesized using an image based rendering technique such as depth image based rendering (DIBR).

For example, a 3D scene is represented using texture and depth maps from multiple viewpoints included in the source content. A target position, or viewpoint, is defined (for example, by a user input), and a set of reference views are identified corresponding to the target view defined by the target position. The set of reference views are then warped to the target position and blended together to generate a final target view. Blending of reference views can include, without limitation, (i) equal weighting of reference views; or (ii) unequal weighting, which may include but is not limited to weighting based on camera distance between the reference view and the target view, weighting based on camera distance, predetermined weighting, weighting defined by metadata in a bitstream, or combinations thereof.

In order to synthesize a target view, the entire reference pixels of each reference viewpoint are processed. As noted above, this may result in a high bandwidth memory requirement, computational complexity, and data rate requirement. Accordingly, various aspects of the present disclosure relate to systems and methods for 3D rendering with reduced data rate, memory, and/or computational complexity requirements. The disclosed matter below, for example, addresses these problems by selecting a subset of reference pixels according to the FOV of the target. When applied to multiple FOVs at multiple resolutions, the result is a foveated DIBR method, which implements foveated rendering using an image based method as discussed below.

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In some example embodiments, mechanisms as described herein form a part of a media processing system, including but not limited to any or more of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units. For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

The Human Vision Field

Techniques as described herein can be implemented based on the knowledge of the (human) eye and how the eye perceives spatial resolution, spatial structures, luminance, colors, changes (e.g., movements, flashing, pulsation, fluctuation, disturbance, etc.) in perceptible visual characteristics, etc.

There are two types of photoreceptors—known as cones and rods—that are present in the eye, as illustrated in FIG. 1A. By way of illustration but not limitation, distributions of cones and rods in FIG. 1A represents those in an average viewer (or the human vision system). Individual viewers may have different vision characteristics that may deviate from the distributions as depicted in FIG. 1A. Techniques as described herein can be used to apply to an individual viewer based on the individual viewer's specific vision characteristics or distributions of cones and rods. Techniques as described herein can also be used to apply to a user population based on average or collective vision characteristics. Cones are responsible for the highest spatial acuity and color vision in the eye's foveal vision field region and for relatively high spatial acuity and color vision in the eye's macular vision field region, etc. Techniques as described herein can be used: to provide pixel values with the highest spatial resolution, a focal-vision frame rate, the highest dynamic range (in luminance), the widest color gamut, etc., for the eye's foveal vision field region, and to provide pixel values with relatively high spatial resolution(s), peripheral-vision and/or non-vision-field frame rate(s), relatively high dynamic range(s), relatively wide color gamut(s), etc., for the eye's vision field region(s) that correspond to relatively high densities of cones.

Rods, on the other hand, do not mediate color vision and have a low spatial acuity, and are quantitatively significantly distributed outside of the eye's foveal vision field region. The rods are sensitive to spatial structures and changes (e.g., movements, flashing, pulsation, fluctuation, disturbance, etc.) in perceptible visual characteristics. Techniques as described herein can be used to provide pixel values with relatively low spatial resolution(s), peripheral-vision and/or non-vision-field frame rate(s), relatively low dynamic range(s), relatively narrow color gamut(s), etc., for the eye's vision field region(s) that correspond to relatively low densities of cones and/or relatively high densities of rods. Additionally, optionally or alternatively, techniques as described herein can be used to provide pixel values with different spatial resolution(s), different frame rate(s), different dynamic range(s), different color gamut(s), etc., for the eye's vision field region(s) that correspond to different densities of cones and/or different densities of rods.

Figure 1B:
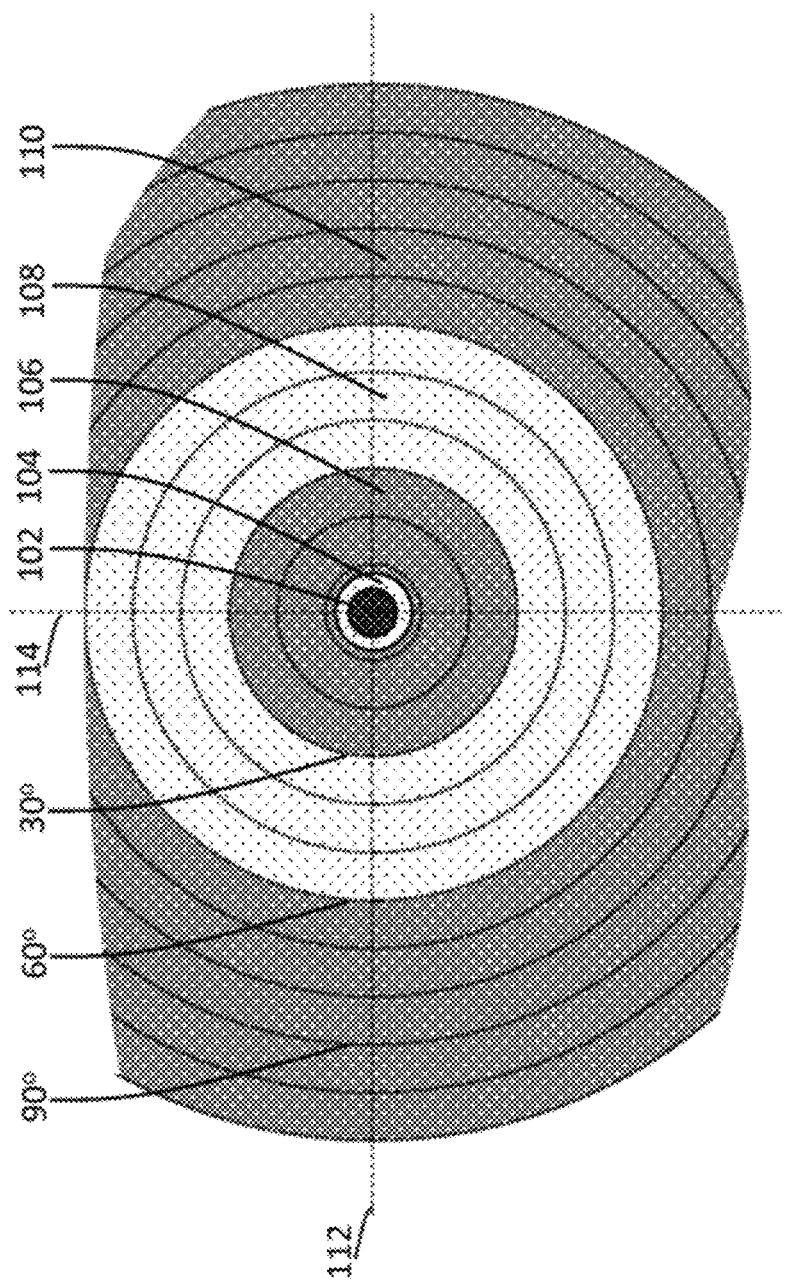
FIG. 1B is an example angular vision field representation of the eye.

FIG. 1B illustrates an example representation of the (human) eye's vision field. Cone and rod distributions (in the eye) as illustrated in FIG. 1A can be segmented into different distribution ranges of cones and rods and further projected into an angular vision field representation (of the eye) as illustrated in FIG. 1B. By way of illustration but not limitation, vision field regions in FIG. 1B represents those in a vision field of an average viewer (or the human vision system).

Individual viewers may have different vision characteristics, and thus may be segmented to vision field regions different from those depicted in FIG. 1B. Techniques as described herein can be used to apply to an individual viewer based on the individual viewer's specific vision field regions. Techniques as described herein can also be used to apply to a user population based on average or collective vision field regions.

By way of example but not limitation, the widest angular range in the eye's vision field is along the horizontal direction of FIG. 1B, which is parallel to the inter-pupil line between the viewer's two eyes, without considering visual constraints from facial anatomy, and may be approximately 180 angular degrees.

Each of concentric circles (e.g., labeled as 30°, 60°, 90°, etc.) represents directions of equal (or the same) angular degree relative to a view direction of the viewer's left or right eye. It should be noted that angles such as 30°, 60°, 90°, etc., are for illustration purposes only. Different values of angles or different set of angles can be used to define or describe a viewer's vision field. The view direction (not shown in FIG. 1B) is pointed vertically out of the plane of FIG. 1B at the intersection of a transverse direction 112 and a vertical direction 114 in a foveal region 102 (the darkest fill pattern). Here, the transverse direction 112 and the vertical direction 114 form a plane vertical to the view direction.

As illustrated in FIG. 1B, the vision field of the eye may be (e.g., logically, projected by certain partitions in the distributions of densities of rods/cones of FIG. 1A, etc.) partitioned into the foveal region 102 immediately surrounded by a paracentral region 104. In some embodiments, the foveal region 102 may correspond to the viewer's fovea vision and extend from zero (0) angular degree to a first angle (e.g., 3-7 angular degrees, 5-9 angular degrees, etc.) relative to the view direction. In some embodiments, the paracentral region 104 may extend from the first angle to a second angle (e.g., 6-12 angular degrees, etc.) relative to the view direction.

The paracentral region 104 is immediately surrounded by a near-peripheral region 106. The near-peripheral region 106 is immediately adjacent to the mid-peripheral region 108, which in turn is immediately adjacent to the rest of the vision field, a far-peripheral region 110. In some embodiments, the near-peripheral region 106 may extend from the second angle to a third angle (e.g., 25-35 angular degrees, etc.) relative to the view direction. In some embodiments, the mid-peripheral region 108 may extend from the third angle to a fourth angle (e.g., 50-65 angular degrees, etc.) relative to the view direction. The far-peripheral region 110 may extend from the fourth angle to the edge of the vision field.

The first, second, third and fourth angles used in this example logical partition of the vision field may be defined or specified along the transverse direction 112. When the vision field of FIG. 1B corresponds to that at a front level viewing direction, the transverse direction 112 may be the same as, or parallel to, the viewer's interpupil line.

It should be noted that different schemes of logically partitioning a viewer's vision field may be used in addition to, or in place of, the scheme of logically partitioning the viewer's vision field into foveal, paracentral, near-peripheral, mid-peripheral, far-peripheral, etc., regions based on angles as illustrated in FIG. 1B.

For example, in some embodiments, the viewer's vision field may be partitioned into more or fewer regions such as a combination of a foveal region, a near-peripheral region and a far-peripheral region, etc., without a paracentral region and/or a mid-peripheral region. A high spatial resolution image layer may be used to cover from the foveal region up to some or all of the near-peripheral region in such logical partition of the viewer's vision field.

In some embodiments, the viewer's vision field may be partitioned based on other quantities other than angles as previously illustrated. For example, in a non-limiting implementation, the foveal region may be defined as a vision field region that corresponds a viewer's foveal vision. The paracentral region may be defined as a vision field region that corresponds a viewer's retina area where cone/rod densities exceed relatively high cone/rod density thresholds. The near-peripheral region may be defined as a vision field region that corresponds a viewer's retina area where cone/rod densities does not exceed relatively high cone/rod density thresholds respectively but does exceed intermediate cone/rod density thresholds. The mid-peripheral region may be defined as a vision field region that corresponds a viewer's retina area where cone/rod densities does not exceed intermediate cone/rod density thresholds respectively but does exceed relatively low cone/rod density thresholds. A focal-vision region as described herein may cover from the viewer's foveal vision up to some or all of a region (e.g., some or all of the viewer's near-peripheral vision, etc.) based on threshold(s) (e.g., cone/rod density threshold(s), etc.) that are not necessarily angle-based.

Additionally, optionally or alternatively, a combination of two or more different schemes of logically partitioning the viewer's vision field and/or other human vision factors may be used to determine a focal-vision region of the viewer's vision field. For example, instead of using a focal-vision region as described herein to cover the same angular value range in different angular directions, the focal-vision region as described herein may cover a larger angular value range along the transverse direction 112 than an angular value range covered by the focal-vision region along the vertical direction 114, as the human vision system may be more sensitive to image details along the transverse direction 112 than those along the vertical direction 114.

In some embodiments, a focal-vision region as described herein covers some or all of: a foveal region (e.g., plus a safety margin, etc.), a paracentral region (e.g., excluding and extending from the foveal region, etc.), a near-peripheral region (e.g., further excluding and extending from the paracentral region, etc.), a mid-peripheral region (e.g., further excluding and extending from the near peripheral region, etc.), etc.

In some embodiments, a focal-vision region as described herein covers a symmetric angular range representing a symmetric (to the viewer's view direction) region of the wide angular range. Examples of the focal-vision region may include, but are not necessarily limited to, one of: ±15 angular degrees, ±20 angular degrees, ±25 angular degrees, etc., relative to the viewer's view direction.

In some embodiments, a focal-vision region as described herein covers an asymmetric angular range representing an asymmetric (to the viewer's view direction) region of the wide angular range. An asymmetric angular range in a vision field of one eye may be defined or specified as covering from an interior angle (looking towards the other/conjugate eye) to an exterior angle (looking away from the other/conjugate eye).

In some implementation examples, the asymmetric angular range is biased with a preference towards interior directions overlapped in both vision fields of the viewer's left and right eyes. Examples of the interior angle of the asymmetric angular range with bias to interior angles may include, but are not necessarily limited to, one of: 15 angular degrees, 30 angular degrees, 45 angular degrees, etc., relative to the viewer's view direction. Examples of the exterior angle of the asymmetric angular range with bias to interior angles may include, but are not necessarily limited to, one of: 10 angular degrees, 15 angular degrees, 20 angular degrees, etc., relative to the viewer's view direction.

In some implementation examples, the asymmetric angular range is biased with a preference towards exterior directions which may or may not be overlapped in both vision fields of the viewer's left and right eyes. Examples of the exterior angle of the asymmetric angular range with bias to exterior directions may include, but are not necessarily limited to, one of: 15 angular degrees, 30 angular degrees, 45 angular degrees, etc., relative to the viewer's view direction. Examples of the interior angle of the asymmetric angular range with bias to exterior directions may include, but are not necessarily limited to, one of: 10 angular degrees, 15 angular degrees, 20 angular degrees, etc., relative to the viewer's view direction.

Additionally, optionally or alternatively, in some embodiments, a vision field of an eye as described herein takes into consideration vision-related factors such as eye swiveling, viewing constraints from nose, corneal, eyelid, etc.

Examples of a focal-vision region as described herein may include, but are not necessarily limited to, any combination of one or more of: circular shapes, oblong shapes, oval shapes, heart shapes, star shapes, round shapes, square shapes, etc.

View Direction Tracking

In some embodiments, only a (e.g., relatively small, etc.) focal-vision region of the eye's vision field needs to be provided with pixel values with the highest (or sharpest) spatial resolution, a focal-vision frame rate, the highest dynamic range, the widest color gamut, etc. In some embodiments, the focal-vision region of the eye's vision field may correspond to (e.g., exactly, approximately, no less than 95% of, no more than 105% of, etc.) the entirety of the foveal vision of the eye up to some or all of near-peripheral vision of the eye. In some embodiments, the focal-vision region of the eye's vision field may additionally include a safety vision field region.

In some embodiments, the size and/or shape of the safety vision field region in the focal-vision region can be preconfigured to a fixed size (e.g., 0%, 5%, 10%, −5%, −10%, etc.) that does not vary with network bandwidth, image content, types of computing devices (e.g., helmet mounted display devices, small form factor computing devices such as credit card size plugin devices, wall displays, etc.) involved in omnidirectional video applications, types of rendering environments (e.g., cloud-based video streaming servers, video streaming servers collocated with video streaming clients, video streaming servers connected with video streaming clients over local wireless connections, etc.) involved in omnidirectional video applications, etc.

In some other embodiments, the size and/or shape of the safety vision field region in the focal-vision region can be dynamically reconfigured at runtime, and can vary in a range (e.g., from −10% to 10%, from −5% to 5%, from 0% to 5-10%, etc.) with one or more of: network bandwidth, image content, types of computing devices (e.g., helmet mounted display devices, small form factor computing devices such as credit card size plugin devices, wall displays, etc.) involved in omnidirectional video applications, types of rendering environments (e.g., cloud-based video streaming servers, video streaming servers collocated with video streaming clients, video streaming servers connected with video streaming clients over local wireless connections, etc.) involved in omnidirectional video applications, etc.

For example, in response to determining that network connections do not support a relatively high bandwidth, the size and/or shape of the safety vision field region may be dynamically shrunk at runtime from 10% to 5% over the eye's foveal vision. On the other hand, in response to determining that network connections do not support a relatively high bandwidth, the size and/or shape of the safety vision field region may be dynamically expanded at runtime from 5% to 10% over the eye's foveal vision.

The size and/or shape of the safety vision field region may also be set in dependence on latency in eye tracking. For example, the user's view direction at runtime may be tracked by a view direction tracking device. The view direction tracking device may operate in real time with a display on which a sequence of images is rendered, for example, through layered representations of the images as generated under techniques as described herein. As the user changes view directions and/or viewing distances from time to time, the view direction tracking device tracks and computes the viewing angles and/or viewing distances in a coordinate system in which the sequence of omnidirectional images is being rendered, generates a time sequence of view directions, and signals each view direction in the time sequence of view directions to a video streaming server as described herein. Each such signaled view direction of the viewer as received by the video streaming server may be indexed by a time point value. The time point value may be associated or correlated by a video streaming server as described herein with a specific image in the sequence of images.

View direction data may be collected, analyzed and/or shared/transmitted among view direction tracking devices and streaming devices with relatively low latency (e.g., within a fraction of one image frame time, within 5 milliseconds, etc.). In an example implementation, the view direction tracking data may be shared among these devices using the lowest latency data/network connections where multiple data/network connections are available.

In response to determining the viewer's view direction relatively expeditiously with relatively low latency (e.g., within a fraction of an image frame time, etc.) based on the view direction data, a video streaming server (e.g., implemented with one or more upstream devices, etc.) may dynamically shrink the size and/or shape of the safety vision field region at runtime from 10% to 5% over the eye's foveal vision. A relatively small area (e.g., within 20 angular degrees from the view direction, etc.) of the highest spatial resolution, the focal-vision frame rate, the highest dynamic range, the widest color gamut, etc., may be sent in the video signal to the downstream recipient device.

On the other hand, in response to determining the viewer's view direction relatively slowly with relatively high latency (e.g., exceeding a time threshold, more than the fraction of one image frame time, longer than 5 milliseconds, etc.) based on the view direction data, the video streaming server may dynamically expand the size and/or shape of the safety vision field region at runtime from 1% to 3%, 2% to 6%, 5% to 10%, etc., over the eye's foveal vision. A relatively large area (e.g., up to 30 angular degrees from the view direction, etc.) of the highest spatial resolution, the focal-vision frame rate, the highest dynamic range, the widest color gamut, etc., may be sent in the video signal to the downstream recipient device. That way, the recipient device of the video signal can have sufficient image data over a relatively large focal-vision region to make local decisions based on the view directions for image rendering purposes.

Images as described herein can be captured/generated with one or more camera systems deployed in one or more spatial environments. Example spatial environments may include, but are not limited to only, any of: physical spatial environment, simulated spatial environment, movie studios, outdoor scenes, indoor scenes, tunnels, streets, vehicles, ships, aircrafts, outer space, etc. Example camera systems may include, but are not limited to only, any of: light field cameras, multiple cameras with overlapping and/or non-overlapping fields of vision, digital cameras, analog cameras, webcams, etc. Additionally or alternatively, images as described herein can be generated by software; for example, in an animated film.

In some embodiments, the image may represent one individual high-resolution image in a sequence of (e.g., high-resolution, etc.) omnidirectional images. A video streaming server may be configured to receive and use the received sequence of images as input to prepare omnidirectional video content for streaming to (downstream) video streaming clients in support of one or more of: video display applications, VR applications, AR applications, automobile entertainment applications, remote presence applications, display applications, etc.

An image as described herein can be represented in any of a wide variety of coordinate systems such as a World coordinate system, a coordinate system stationary to a camera system, a coordinate system fixed relative to a spatial environment, etc. A spatial position in the image may be either an absolute position (e.g., represented in the World coordinate system, etc.) or a relative position (e.g., represented in a relative coordinate system stationary to the camera system, etc.).

In some embodiments, a spatial position (e.g., a pixel, etc.) in the image can be represented by a set of specific (x, y) coordinate values. By way of example but not limitation, the x coordinate value of the specific (x, y) coordinate values may correspond to a specific longitudinal degree (ranging from 0 to 360 angular degrees) in the image representation in a 3D space, whereas the y coordinate value of the (x, y) coordinate values may correspond to a specific latitudinal degree (ranging from 0 to 180 angular degrees) in the image representation in the 3D space. In various embodiments, geometric transformations can be used to transform a set of (e.g., x, y) coordinate values of a spatial position in one image representation into another set of (e.g., pitch, roll, yaw, sway, heave, surge, etc.) coordinate values of the same position in other image representations such as the image representation, etc.

Foveated DIBR

Figure 2:
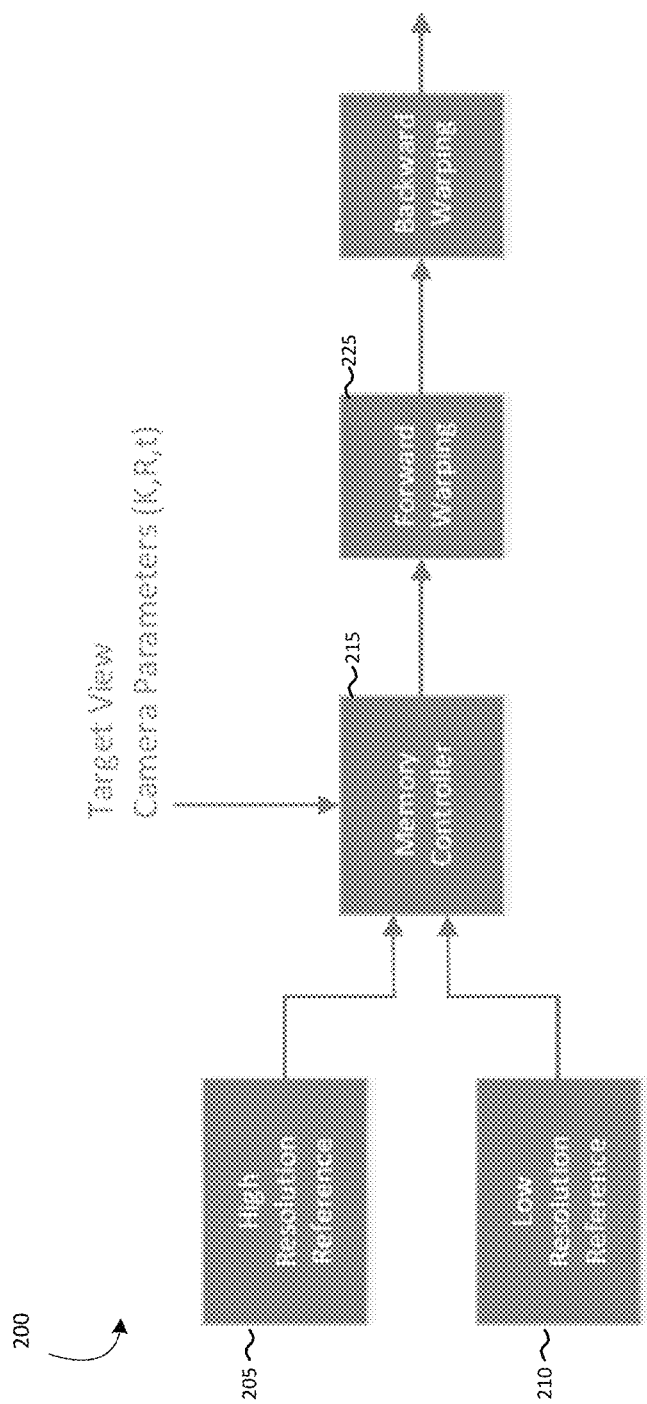
FIG. 2 is a process diagram of the process implemented by a processing device according to various aspects of the present disclosure.
Figure 3A:
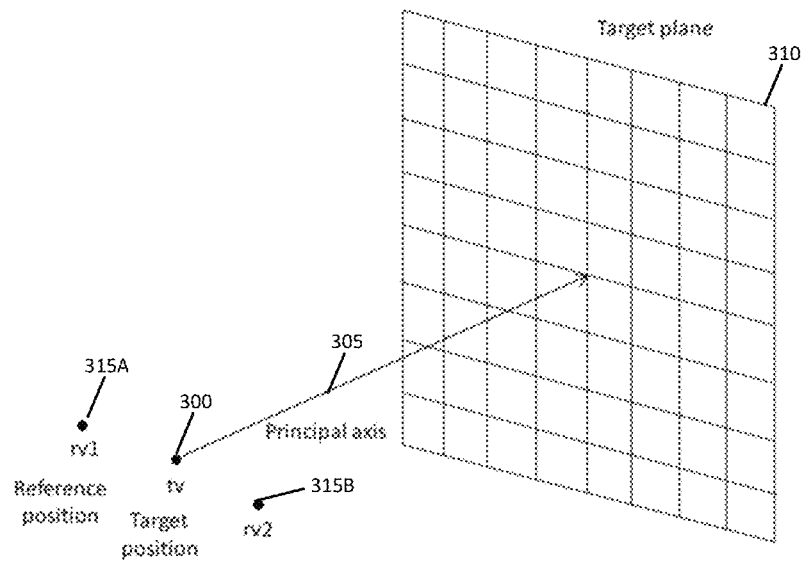
FIG. 3A is a model diagram of the imaging process of FIG. 2 according to various aspects of the present disclosure.
Figure 3B:
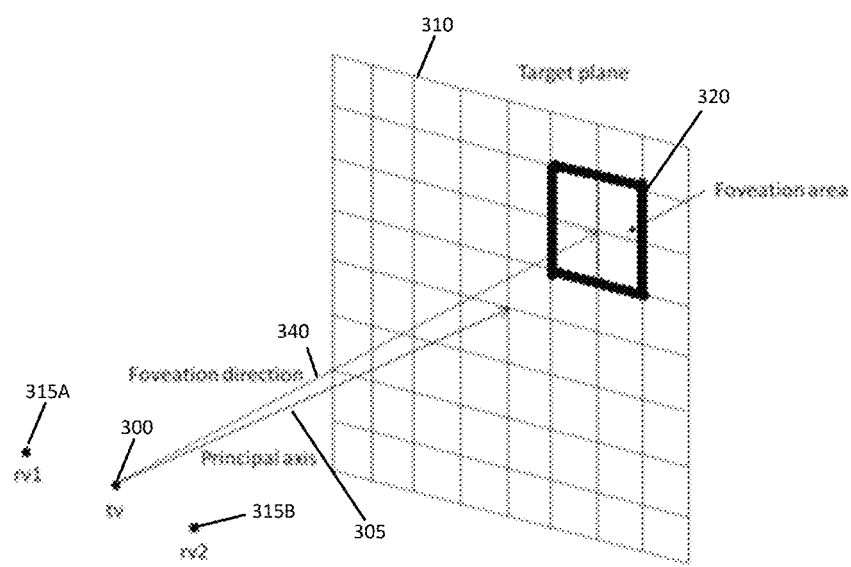
FIG. 3B is a model diagram of the imaging process of FIG. 2 according to various aspects of the present disclosure.
Figure 3C:
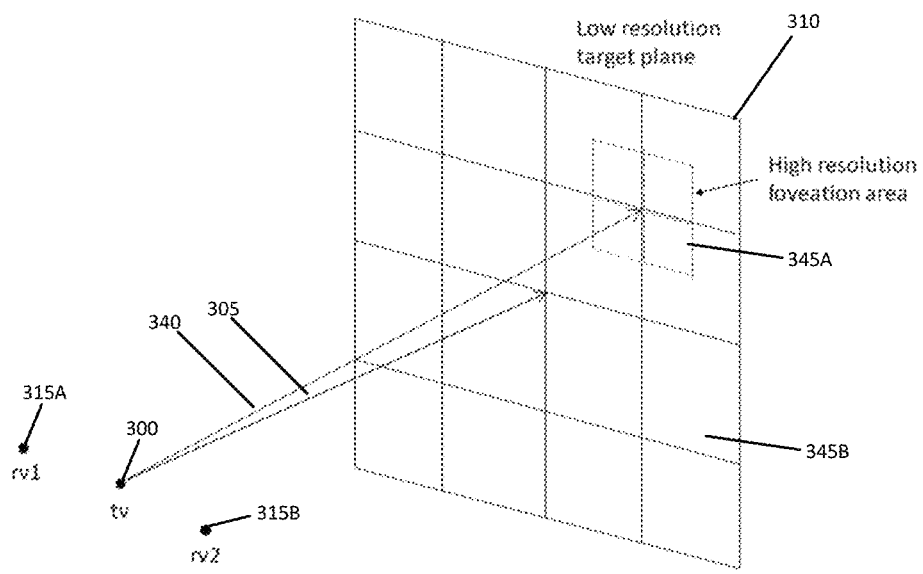
FIG. 3C is a model diagram of the imaging process of FIG. 2 according to various aspects of the present disclosure.
Figure 3D:
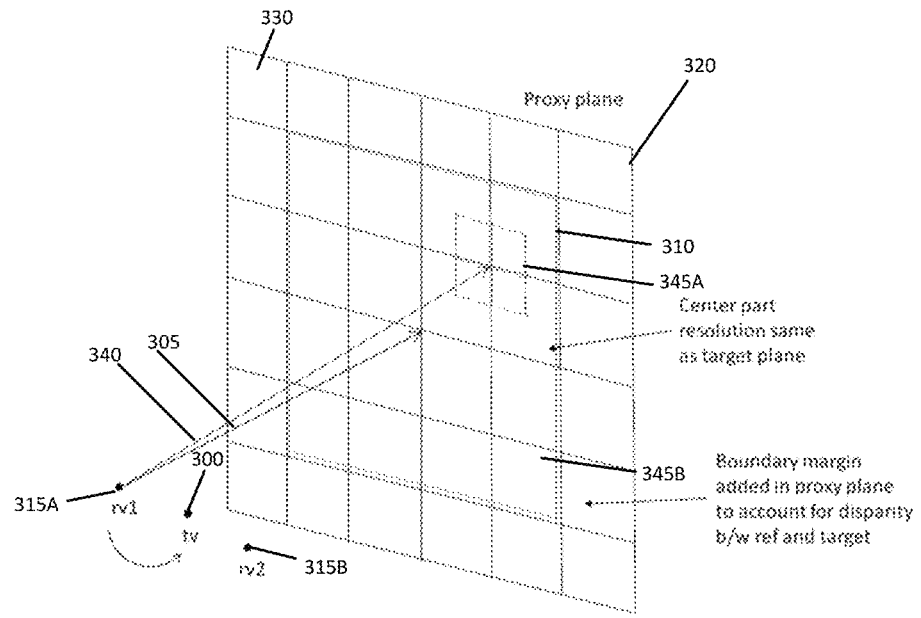
FIG. 3D is a model diagram of the imaging process of FIG. 2 according to various aspects of the present disclosure.
Figure 4:
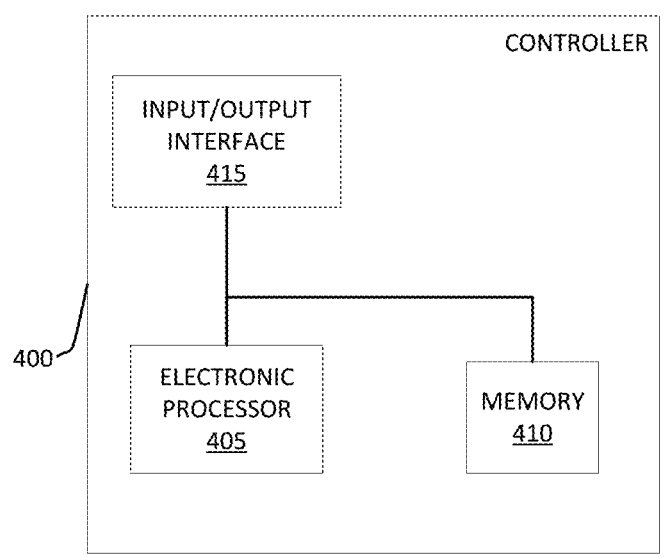
FIG. 4 is a block diagram of a processing device capable of implementing the imaging process of FIG. 2 according to various aspects of the present disclosure.

FIG. 2 is a process diagram 200 illustrating a multiple view video rendering process implemented by a controller 400 (FIG. 4). The process includes a memory controller 215. The memory controller 215, as explained in more detail below, receives source content 202. The source content 202 is image information corresponding to one or more reference viewpoints (referred to herein as references). In particular, each reference defines a 360° reference image plane (comprised of pixels, each including depth and texture information) of image information. The source content 202 may be received from one or more sources. In some embodiments, the source content 202 includes information corresponding to a virtual camera. In some embodiments, the source content 202 includes information captured or based off of information captured by a physical camera. The source content 202 may be represented in multiple resolutions for multiple references. In some embodiments, the source content 202 is 360° video. As illustrated in FIG. 2, the source content 202 may be divided into two categories based on the resolution: a high resolution source 205 and a low resolution source 210. For ease of description, the system diagram, as well as the process described in regard to FIGS. 3A-3D below, are described in regard to the two sources 205, 210 and their corresponding references. It should be understood that, in further embodiments, the process may utilize more than two sources and references of various resolutions.

The memory controller 215 receives/determines a target view. As mentioned above, the target view is a desired area of a 3D space. For example, as shown in FIG. 3A, a target viewpoint 300 defines a viewing origin in space. An optical or principal axis 305, illustrates the viewing direction from the target viewpoint 300, and defines an image center of a target image region 310. The target image region 310 is a bounded region of a plane (referred to herein as a target image plane) in 3D space in which desired 3D video rendering (to be generated) is "seen" at the target viewpoint 300. As explained below, the desired rendering is created by a synthesis of the image information correlating to one or more references at or proximate to the target view (for example, references 315A and 315B). As explained below in regard to FIG. 3B, the target image plane may be partitioned into multiple, non-overlaying target image regions. For ease of description, the example discussed herein is in terms of a single target image region 310.

Returning to FIG. 2, the memory controller 215 receives/defines the extrinsic and intrinsic camera parameters (K, R, t) corresponding to the target view. These parameters denote a projective mapping from world coordinates to pixel coordinates. The memory controller 215 determines, based on the target view (and target camera parameters) the reference pixels of one or more references (for example, references 315A and 315B) that "fit" within the target image region 310. In some embodiments, the reference 315A of FIGS.

3A-3D corresponds to high resolution source content while the reference 315B of FIGS. 3A-3D corresponds to a low resolution source content. These reference pixels are then forward warped to generate an appropriate depth for each reference pixel (block 225). The reference pixels are then backwards warped to generate an appropriate texture for each pixel. All reference pixels of each corresponding reference are then synthesized to create the desired rendering.

It may be preferable (e.g., from a memory bandwidth, data rate, and/or computational complexity standpoint) to limit the number of reference pixels of each reference that are forward mapped. Accordingly, as shown in FIG. 3D, a proxy region 320 is defined based on the target image region 310. The proxy region 320 is a bounded plane region in 3D space with the same camera pose as the target region 310 (in other words, the region 320 and region 310 both lay on the target image plane). The proxy region 320 is larger than the target image region 310 by a margin 330. The margin 330 is to account for object shifts when the viewpoint changes from a reference to a target viewpoint. The size of the proxy image region 320 may be determined based on either or both of a depth range and a virtual or real camera array layout.

The proxy region 325 acts as a memory controller (such as the memory controller 215 of FIG. 2) that defines/determines the plurality of reference pixels of one or more references to process in the rendering of the target image region 310. In other words, the reference pixels (of one or more references) that fit within the proxy region 320 are forward warped and backward warped for the desired video rendering, as opposed to warping all of the reference pixels of the one or more references that fit within the target image plane.

As mentioned above, the target image plane is partitioned into multiple target image regions 310. The memory controller 215 achieves this by mapping the received source content 202 using a projective mapping technique and partitioning the mapped source content 202 into a plurality of target image regions 310. The memory controller 215 then determines a subset of the plurality of target image regions 310 for synthesis of a target view based on the proxy image region 320 surrounding each target image region 310. Each of the target image regions 310 of the subset are then composited to create video rendering for the target image plane. Alternatively, or additionally, the subset may be stored or transmitted to a separate device for further processing. Depending on the application, the target image region 310 may be partitioned into multiple regions with multiple resolutions, for instance, based on an area in which a viewer's attention is focused on (foveal vision). Returning to FIG. 3B, the target image region 310 includes a focus area 335 defined by a viewer's focus (indicated by axis 340 originating at the target viewpoint 300). The particular size of the focus region 320 may be predetermined or calculated based on the desired resolution level, actual image content, and so on.

FIG. 3C illustrates the target image region 310 divided into a high resolution region 345A (corresponding to the focus area 335 of FIG. 2C) and a remaining low resolution region 345B. The high resolution region 345A may require more references (or references of higher resolution content) than for the remaining low resolution region 345B. The region 345A may be defined by a particular area that a viewer's focus is on (as indicated by the axis 350).

In some embodiments, the rendering process utilizes foveation imaging/rendering techniques. Foveation is where an image resolution (or amount of detail) varies across the image according to one or more fixation points. A fixation point indicates the highest resolution region of the image. The fixation point may correspond to a particular point of a viewer's focus (such as the point the axis 340 intersects the target image region 310). One or more of the fixation points may be defined or determined using eye-tracking techniques. In some embodiments, the one or more fixation points are predetermined. In some embodiments, the region 345A may be considered a foveation area while the region 345B may be considered a peripheral area.

In some embodiments, following the rendering of the high resolution region 345A and low resolution region 345B, one or more smoothing processes may be applied to soften one or more portions of where the high resolution region 345A meets the low resolution region 345B. In other words, the change in resolution surrounding the high resolution area 345A to the low resolution are 345B may be made gradual (rather than a sharp, sudden change in resolution).

FIG. 4 is a block diagram of a controller 400 in accordance with some embodiments. The controller 400 includes an electronic processor 405, a memory 410, and an input/output interface 415. The electronic processor 405 obtains and provides information (for example, from the memory 410 and/or the input/output interface 415), and processes the information by executing one or more software instructions or modules, capable of being stored, for example, in a random access memory ("RAM") area of the memory 410 or a read only memory ("ROM") of the memory 410 or another non-transitory computer readable medium (not shown). The software can include firmware, one or more applications, program data, filters, rules, one or more program modules, and other executable instructions. The electronic processor 405 may include multiple cores or individual processing units. The electronic processor 405 is configured to retrieve from the memory 410 and execute, among other things, software related to the control processes and methods described herein.

The memory 410 can include one or more non-transitory computer-readable media, and includes a program storage area and a data storage area. The program storage area and the data storage area can include combinations of different types of memory, as described herein. The memory 410 may take the form of any non-transitory computer-readable medium.

The input/output interface 415 is configured to receive input and to provide system output. The input/output interface 415 obtains information and signals from, and provides information and signals to (for example, over one or more wired and/or wireless connections) devices both internal and external to the controller 400, for example, a video data source of the source content 202 (FIG. 1).

EQUIVALENTS, EXTENSIONS, ALTERNATIVES, AND MISCELLANEOUS

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. For example, the techniques disclosed herein may be applied to projection systems that are designed for non-3D content. For instance, a dual-head projection system may utilize the disclosed technology. Furthermore, the disclosed techniques may be applied to more than two projection heads.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

We claim:

1. A device for video rendering, the device comprising:
a memory; and
an electronic processor configured to
receive, from a source device, video data including multiple reference viewpoints,
determine a target image plane corresponding to a target viewpoint,
determine, within the target image plane, one or more target image regions,
determine, for each target image region within the target image plane, a proxy image region, the proxy image region being larger than the corresponding target image region by a margin surrounding the corresponding target image region,
determine, for each target image region within the target image plane, a plurality of reference pixels that fit within the corresponding proxy image region, from one or more of the multiple reference viewpoints,
perform, for each target image region within the target image plane, a warping operation on the plurality of reference pixels, and
project, for each target image region within the target image plane, the plurality of reference pixels that fit within the corresponding proxy image region, from the one or more multiple reference viewpoints, to the target image region within the target image plane,
wherein the at least one target image region is a plurality of target image regions, wherein projecting the plurality of reference pixels that fit within the corresponding proxy image produces a rendered target region from each target image region.

2. The device of claim 1, wherein respective ones of the plurality of target image regions are rendered with different resolutions.

3. The device of claim 2, wherein the electronic processor is configured to partition the at least one target image region into the plurality of target image regions using a projective mapping technique.

4. The device of claim 1, wherein the at least one target image region is a plurality of target image regions, and a number of reference viewpoints is different for each target image region.

5. The device of claim 1, wherein the proxy image region is determined based on at least one of a depth range, a virtual camera array layout, or real camera array layout.

6. The device of claim 1, wherein the margin is predetermined.

7. The device of claim 1, wherein at least one target image region is determined based on a focus area of a viewer.

8. The device of claim 7, wherein the focus area is a foveation area having a resolution greater than a resolution of a peripheral area within the target image region.

9. A method for video rendering, the method comprising:
receiving, from a source device, video data including multiple reference viewpoints;
determining a target image plane corresponding to a target viewpoint,
determining, within the target image plane, one or more target image regions,
determining, for each target image region within the target image plane, a proxy image region, the proxy image region being larger than the corresponding target image region by a margin surrounding the corresponding target image region;

determining, for each target image region within the target image plane, a plurality of reference pixels that fit within the corresponding proxy image region, from one or more of the multiple reference viewpoints;

performing, for each target image region within the target image plane, a warping operation on the plurality of reference pixels, projecting, for each target image region within the target image plane, the plurality of reference pixels that fit within the corresponding proxy image region, from the one or more multiple reference viewpoints, to the target image region within the target image plane, wherein the at least one target image region is a plurality of target image regions, wherein respective ones of the plurality of target image regions are a plurality of target image regions, wherein projecting the plurality of reference pixels that fit within the corresponding proxy image produces a rendered target region from each target image region.

10. The method of claim 9, wherein respective ones of the plurality of target image regions are rendered with different resolutions.

11. The method of claim 9, wherein the at least one target image region is a plurality of target image regions, and a number of reference viewpoints is different for each target image region.

12. The method of claim 11, further including:
partitioning the at least one target image region into the plurality of target image regions using a projective mapping technique.

13. The method of claim 9, wherein the proxy image region is determined based on at least one of a depth range, a virtual camera array layout, or real camera array layout.

14. The method of claim 9, wherein the margin is predetermined.

15. The method of claim 9, wherein at least one target image region is determined based on a focus area of a viewer.

16. The method of claim 15, wherein the focus area is a foveation area having a resolution greater than a resolution of a peripheral area within the target image region.

17. A device for video rendering, the device comprising:
a memory; and
an electronic processor configured to
receive source content including multiple reference viewpoints,
map the source content using a projective mapping technique,
partition the mapped source content into a plurality of tiles,
determine a subset of the plurality of regions for synthesis of a target view based on a proxy image region surrounding each target image region of a plurality of target image regions, wherein the proxy image region is determined based on at least one of a depth range, a virtual camera array layout, or real camera array layout,
determine, for each target image region, a plurality of reference pixels that fit within the corresponding proxy image region, from one or more of the multiple reference viewpoints,
render the subset of the plurality of regions by performing a warping operation on the plurality of reference pixels within the proxy image region surrounding each target image region, and
project, for each target image region, the plurality of reference pixels that fit within the corresponding proxy image region, from the one or more multiple reference viewpoints, to the target image region,
wherein projecting the plurality of reference pixels that fit within the corresponding proxy image region produces a rendered target region from each target image region.

18. The device of claim 17, wherein a respective size of a respective tile is based on the resolution of the tile.

19. The device of claim 17, wherein a number of reference viewpoints is different for each target image region.

20. The device of claim 15, wherein the projective mapping technique is an equirectangular mapping or a cube mapping.

* * * * *